United States Patent Office 2,953,579
Patented Sept. 20, 1960

2,953,579

EPOXY ALDIMINES

Paul H. Williams, Orinda, and George B. Payne, and Paul R. Van Ess, Berkeley, Calif., assignors to Shell Oil Company, New York, N.Y., a corporation of Delaware No Drawing. Filed May 7, 1958, Ser. No. 733,491

6 Claims. (Cl. 260—348)

This invention relates to novel epoxy compounds and to a process for preparing them. More specifically, the invention relates to new and useful epoxyimino compounds and to a process for preparing them from epoxyaldehydes. Still more particularly, the invention relates to such epoxyimines as are prepared by the reaction between an epoxyaldehyde and an organic amino compound.

Epoxy compounds such as epichlorohydrin are well-known reactants in the preparation of such materials as resins. The preparation of such nitrogen-containing epoxy compounds as epoxyimines from the reaction of epoxy compounds and amines has not, however, been considered feasible because of the well-known tendency of the epoxy ring to be opened in the course of the reaction. For example, when ethylene oxide is reacted with diethylamine, the ring opens to yield diethylaminoethanol as a product. We have unexpectedly discovered, however, that it is possible to react epoxy ring-containing compounds of a certain type with amines under conditions whereby the ring is not attacked. The resulting reaction product is thus characterized by possession of an intact

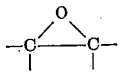

ring.

The epoxyimino compounds of this invention have a variety of desirable uses. For example, the monoepoxyimines are valuable plasticizers and modifiers in polyepoxy resins. Moreover, since they possess an intact oxirane ring, they are extremely useful as stabilizers in polyvinyl halide-type resins where they inhibit degradation resulting from the release of hydrogen halide. The polyepoxyimines form useful resinous materials when cured with such well-known curing agents as anhydrides, acids, or boron trifluoride. By virtue of their possession of a variety of reactive groups our epoxyimines may be used as chemical intermediates, e.g., as starting points for the synthesis of such derived chemical products as lubricating oil additives, detergents, surface-active agents, biologically active compounds, and the like.

It is an object of this invention to provide a new class of epoxy compounds. A further object of the invention is the provision of selectively reacting the carbonyl group of an epoxyaldehyde with a primary amine to produce novel epoxyimines. It is a further object of the invention to provide novel epoxyimino compounds, and a still further object of the invention is to provide a unique process whereby epoxyaldehydes can be reacted with organic amino compounds to yield the epoxyimines without attack on the epoxy ring. The unique epoxyalkylidene imino compounds resulting from the reaction are yet another object of the invention. Other objects of the invention will be apparent from the following description thereof.

The invention comprises epoxyimino compounds having at least one epoxyalkylidene substituent. In the context of this invention, imino is used to denote those compounds having the imino linkage >C=N—. Such compounds may best be described by the formula $$(R=N)_n—R'$$

where R is an epoxy alkylidene radical, R' is an organic radical, and $n$ is a positive integer.

By epoxyalkylidene radical we mean an alkylidene radical, that is, a divalent organic radical derived from an aliphatic hydrocarbon and from which two hydrogen atoms are taken from the same carbon atoms, and containing an epoxy ring. The epoxy ring, or oxirane ring as it is sometimes termed, is characterized by the structure,

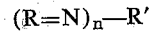

Lee and Neville, Epoxy Resins (McGraw-Hill, 1957), page 6. Since the oxygen atom is connected to two vicinal, or adjacent, carbon atoms, the configuration shown is also sometimes termed the vicinal-epoxy ring. In the epoxyalkylidene radicals of the invention, the epoxy ring may be either an internal ring, or it may be a terminal ring, wherein one of the carbon atoms of the ring is a terminal carbon atom of the epoxyalklidene chain. Since terminal epoxy rings are considerably more reactive than are internal epoxy rings, epoxyalkylidene radicals having terminal epoxy rings and less than eight carbon atoms are preferred in this invention.

The epoxyimines of our invention can best be understood by considering the manner in which they are synthesized. In general, such imines are prepared by reacting an epoxyaldehyde and an organic primary amine at temperatures such that the ring is not attacked.

The epoxyaldehyde reactant includes all compounds characterized by the possession of both the formyl group —CHO and the epoxy or oxirane group

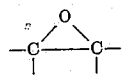

These compounds may readily be prepared by the epoxidation of unsaturated aldehydes. The preferred class of epoxyaldehydes consists of those epoxy compounds produced by the oxidation of alpha,beta-unsaturated aldehydes such as acrolein, crotonaldehyde, methacrolein, tiglic aldehyde, citral, cinamaldehyde, and the like, and the most preferred epoxyaldehyde is glycidaldehyde, which is prepared by the oxidation of acrolein. Equally useful in the process of our invention are, however, epoxyaldehydes which are prepared from olefinic aldehydes having one or more double bonds further removed from the formyl group. Typical examples of such aldehydes are vinyl acetaldehyde, 3-pentenal, 4-pentenal, methyl vinyl acetaldehyde, isopropenyl acetaldehyde, citronellal, rhodinal, and 2-phenyl-4-hexenal.

These epoxyaldehydes are reacted in our invention with an organic primary amine to produce the novel epoxyimines. Such organic amino compounds consist of organic compounds having at least one primary amino group, —$NH_2$, in their constitution. Amines having more than one such primary amino group are, of course, included within the scope of our process.

Examples of suitable monoamine reactants, those having the structure R'—$NH_2$, include the aliphatic amines, including such alkylamines as methyl, ethyl, butyl, tert-butyl, and laurylamines and such alkenylamines as allylamine, methallylamine, ethallylamine and pentene-2-amine, as well as the cyclic amines such as cyclopentyl and cyclohexylamine and aniline. Included as well in the suitable primary amine reactants are the diamines, $H_2N$—R'—$NH_2$, such as ethylenediamine, trimethylenediamine, hexamethylenediamine, the phenylenediamines, benzidine, the toluidines, o-toluidene, and such substituted aromatic diamines as durenediamine. Organic compounds having more than two amino groups, such as triaminobenzene, are also within the scope of the invention.

The amino reactants include, in addition to the hydrocarbon amino compounds of the preceding paragraph, organic compounds having other substituents in addition to the —NH₂ groups. Thus, the primary amino compounds noted may also have included within the molecule such other groups as nitro-hydroxy, ether, keto, nitrile, and the like, or halogen atoms. Illustrative of such substituted compounds are chlorallylamine, the aminobenzoic acids, the nitroanilines, sulfanilic acid and its isomers, the haloanilines, ethanolamine, the aminophenols, o-dianisidine, and the like. Such heterocyclic primary amines as 2-aminopyridine, N-methyl-2-piperidineamine, furfurylamine and tetrahydrofurfurylamine are also within the scope of organic primary amine reactants in the invention.

As has been noted, the epoxyaldehyde and the organic amino compound are reacted together in our invention to form the novel imino compounds described. If desired, the reaction may be conducted in the presence of desiccant agents, such as magnesium sulfate, calcium oxide, or the like, or alternatively, the reaction may be conducted at high temperatures and in the presence of liquids which remove water overhead as an azeotrope. We prefer to conduct the reaction between the epoxyaldehyde and the organic amino compound in a liquid which is a solvent for the reactants and the product imine, but with which water is not miscible, so that the water is removed from the locus of the reaction as it forms and without the use of either high temperatures or drying agents. Combinations of water-immiscible solvents and drying agents are, of course, within the scope of the invention. It should be emphasized, however, that the removal of the product water merely serves to hasten the completion of the reaction and, as will be seen, is not a necessary element for the preparation of our novel epoxyimino compounds.

Examples of the liquids in which the reaction may be conducted include the paraffins such as those liquid at or below room temperature; the aromatic solvents, such as benzene, toluene and xylene; and such other organic liquids as the ethers, including diethyl ether, and acetone. One convenient way of conducting the reaction is to prepare a solution of the epoxyaldehyde and one of the organic amino compound in such a solvent as described, and merely mixing these solutions to bring about the production of the epoxyimine. The reaction may, however, be conducted in the absence of solvent if desired.

The reactants may be employed in a wide variety of proportions. A large excess of the amine may, depending on the solvent and reaction conditions, result in attack on the epoxy ring of the aldehyde, and so we prefer that approximately stoichiometric amounts of the organic amino compound and the epoxyaldehyde be employed. By this we mean that about a stoichiometric amount of epoxyaldehyde should be used for every —NH₂ group of the organic amino compound.

The reaction between the epoxyaldehydes and the organic amino compounds proceeds satisfactorily at ordinary temperatures and without the need for catalysts or initiators. While the most convenient temperature range for the reaction to be conducted is between about 0° and about 100° C., the preferred temperature range is that between about 20° C., that is, room temperature, and about 0° C. At temperatures in excess of about 100° C., while the reaction will proceed, there is some danger that the epoxy ring of the aldehyde or of the imine will be attacked. The process of our invention may be carried out at temperatures below 0° C., but at these temperatures the reaction rate decreases and many of the solvents become solids.

Following the reaction, the novel epoxyimino compounds of our invention may be readily recovered by their separation from the solvent, utilizing such well-known methods of organic chemistry as vacuum distillation. The nature of these imines will be seen from the examples which follow.

It will be apparent from this description of our invention that a wide variety of epoxyimines having the formula (R=N)ₙ—R' may be prepared by selecting suitable reactants in our process. For example, by choosing the following reactants, the following epoxyimines may be prepared:

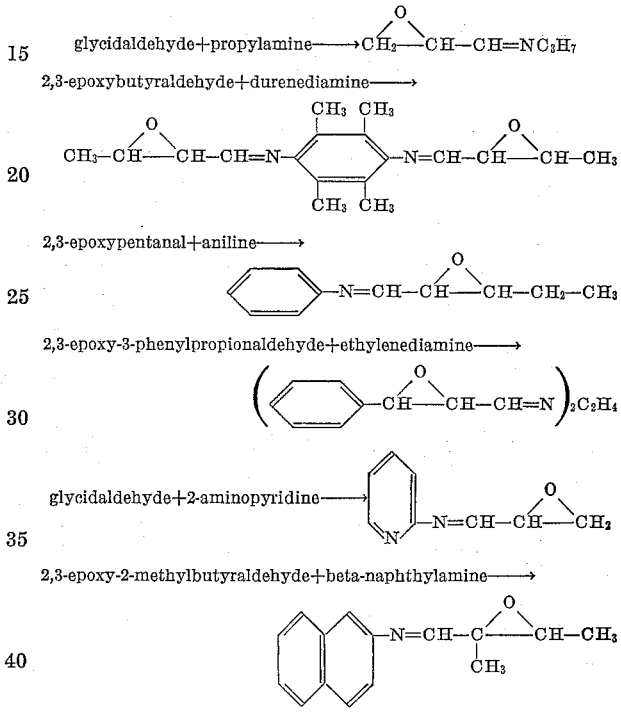

The following examples are intended to illustrate but not limit the embodiments of the invention as recited in the appended claims. It is therefore to be understood that the invention is not to be limited to the specific materials or conditions recited therein. Unless otherwise noted, all proportions given in the examples are in parts by weight.

*Example I.—Preparation of N-glycidylidene t-butylamine*

Clear benzene solutions containing 0.33 moles of glycidaldehyde and 0.30 moles of tert-butylamine were prepared, and cooled to 10° C. The solutions were then mixed thoroughly, and water was observed to settle out at once. The mixture was allowed to stand for one hour at 5° C., dried over anhydrous magnesium sulfate, filtered, and the benzene stripped therefrom.

Upon Claisen distillation, water-white N-glycidylidene t-butylamine was obtained in 82% yield. The product had a boiling point of 40–45° C. at 7–9 mm., and its composition was found to be as follows:

| | Percent C | Percent H | Percent N | Epoxy Value eq./100 g. |
|---|---|---|---|---|
| Calculated for C₇H₁₃NO | 66.1 | 10.3 | 11.0 | 0.79 |
| Found | 66.2 | 10.4 | 10.9 | 0.77 |

These data corresponded to the compound having the formula

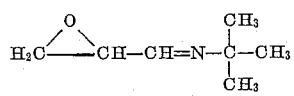

Example II.—Preparation of N-glycidylidene t-butylamine in acetone

A solution of 0.25 moles of t-butylamine in 25 parts of acetone was added portionwise with swirling to a solution of 0.27 moles of anhydrous glycidaldehyde in 25 parts of acetone. Ice bath cooling was used to keep the temperature of the reaction mixture below 20° C. The mixture was then allowed to stand at room temperature for about 30 minutes and then Claisen-distilled at room temperature and reduced pressure to remove the acetone and the water of reaction.

An 84% yield of N-glycidylidene t-butylamine, having a boiling point of 45–50° at 10 mm., was thus obtained, demonstrating that the reaction could be conducted even in the presence of water.

Example III.—Preparation of N-glycidylidene t-butylamine in the absence of solvent 0.25 mole of t-butylamine was added dropwise, with stirring, to 0.28 mole of glycidaldehyde, the reaction mixture being maintained at a temperature below 20° C. The mixture was then allowed to stand at room temperature for about 30 minutes, and then Claisen-distilled as in Example II.

An 80% yield of N-glycidylidene t-butylamine, having a boiling point of 40–45° C. at 8 mm., was thus obtained, demonstrating that excellent yields may be obtained even if the reaction is carried out without solvent of any kind.

Example IV.—Preparation of N-glycidylidene ethylamine

Using the method described in Example I, glycidaldehyde was reacted with ethylamine. A 69% yield of N-glycidylidene ethylamine was obtained. The compound had a boiling point of 46–49° C. at 30 mm., a refractive index of $1.4389_D^{22}$, and upon analysis was found to have the following composition:

|  | Percent C | Percent H | Percent N | Base No. eq./100 g. | Epoxy Value eq./100 g. |
|---|---|---|---|---|---|
| Calculated for $C_5H_9ON$ | 60.6 | 9.2 | 14.1 | 1.01 | 1.01 |
| Found | 61.0 | 9.2 | 13.6 | 0.97 | 0.95 |

By using epoxybutyraldehyde in place of glycidaldehyde, N-(2,3-epoxybutylidene) ethylamine can be prepared in equivalent yield.

Example V.—Preparation of N-glycidylidene aniline

As in the previous experiments, 0.33 moles of anhydrous glycidaldehyde in benzene and 0.30 moles of freshly distilled aniline in benzene were reacted at 0° C. After drying and purification, a 94% yield of N-glycidylidene aniline was obtained. The compound had a boiling point of 58–59° C. at 0.13 mm., a refractive index of $1.5772_D^{21}$, and analysis showed the following composition:

|  | Percent C | Percent H | Percent N | Base No. eq./100 g. | Epoxy Value eq./100 g. |
|---|---|---|---|---|---|
| Calculated for $C_9H_9ON$ | 73.5 | 6.2 | 9.5 | 0.68 | 0.68 |
| Found | 73.4 | 6.5 | 9.7 | 0.67 | 0.63 | which correspond to a compound having the structure

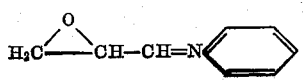

By using alpha-naphthylamine in place of aniline, N-glycidylidene-alpha-naphthylamine can be prepared in the same manner.

Example VI.—Preparation of p-(N-glycidylidene)aminobenzoic acid

Solutions of approximately equimolar amounts of glycidaldehyde in diethyl ether and p-aminobenzoic acid in ether were stirred together overnight at room temperature. p-(N-glycidylidene)aminobenzoic acid was obtained in 100% yield, having the following composition:

|  | Percent C | Percent H | Percent N | Neut. Equiv. |
|---|---|---|---|---|
| Calculated for $C_{10}H_9NO_3$ | 62.8 | 4.8 | 7.3 | 191 |
| Found | 62.5 | 6.6 | 6.8 | 200 | which corresponded to the compound having the structure

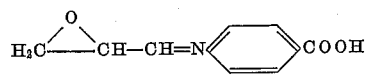

Example VII.—Preparation of N,N'-bis(glycidylidene) durenediamine

A solution of 0.70 moles of glycidaldehyde in 1000 parts of benzene was stirred with 25 parts of anhydrous magnesium sulfate and treated portionwise with 0.32 moles of durenediamine. The mixture was stirred for about 30 minutes at room temperature and then filtered to remove the solid desiccant. Upon weighing, the magnesium sulfate was found to contain the theoretical amount of water.

The filtrate was allowed to stand at room temperature, and within about 30 minutes the solid product began to crystallize slowly. After standing overnight, a 54% yield of N,N'-bis(glycidylidene) durenediamine was obtained having the following composition:

|  | Percent C | Percent H | Percent N |
|---|---|---|---|
| Calculated for $C_{16}H_{20}N_2O_2$ | 70.6 | 7.4 | 10.3 |
| Found | 70.6 | 7.5 | 10.2 | which corresponded to the structure

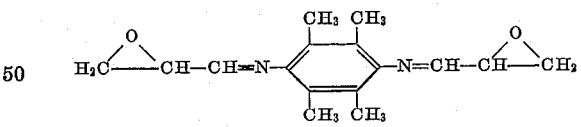

The compound had a melting point of 155–165° C.

We claim as our invention:

1. An epoxy aldimine having the structural formula

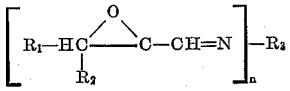

where $R_1$ represents a member of the class consisting of hydrogen, methyl, ethyl, and phenyl, $R_2$ represents a member of the class consisting of hydrogen and methyl, and $R_3$ represents a member, having up to 12 carbon atoms, of the class consisting of the unsubstituted alkyl, alkylene, pyridyl, naphthyl, and phenyl radicals, and carboxy phenyl and methyl-substituted phenylene, and $n$ is a positive integer of from 1 to 2, equal to the valence of the radical represented by $R_3$.

2. N-(2,3-epoxypropylidene)-t-butylamine.
3. N-2,3-epoxypropylidene aniline.
4. N-N'-bis(2,3-epoxypropylidene)-durene diamine.
5. N-(2,3-epoxypropylidene)-p-aminobenzoic acid.
6. N-2,3-epoxypropylidene ethylamine.

No references cited.